United States Patent
Kim et al.

(10) Patent No.: US 7,328,988 B2
(45) Date of Patent: Feb. 12, 2008

(54) INK COMPOSITION FOR INKJET SPACER FORMATION AND SPACER ELEMENT USING THE SAME

(75) Inventors: Joon-Hyung Kim, Daejeon (KR); Young-Sun Kong, Seoul (KR); Kyung-Jun Kim, Daejeon (KR)

(73) Assignee: LG Chem, Ltd. (KR)

( * ) Notice: Subject to any disclaimer, the term of this patent is extended or adjusted under 35 U.S.C. 154(b) by 167 days.

(21) Appl. No.: 10/496,893

(22) PCT Filed: Aug. 13, 2003

(86) PCT No.: PCT/KR03/01634

§ 371 (c)(1),
(2), (4) Date: May 25, 2004

(87) PCT Pub. No.: WO2004/065502

PCT Pub. Date: Aug. 5, 2004

(65) Prior Publication Data

US 2004/0257416 A1 Dec. 23, 2004

(30) Foreign Application Priority Data

Jan. 22, 2003 (KR) .................. 10-2003-0004269

(51) Int. Cl.
*G01D 11/00* (2006.01)
*B01D 19/02* (2006.01)

(52) U.S. Cl. .................. 347/100; 347/95; 349/155; 429/324

(58) Field of Classification Search ................ 347/100, 347/95, 96, 101, 105; 106/31.6, 31.13, 31.27; 523/160; 524/1; 428/1.1; 430/280.1; 429/324; 349/155; 516/115, 198
See application file for complete search history.

(56) References Cited

U.S. PATENT DOCUMENTS

| 6,695,443 | B2 * | 2/2004 | Arita et al. ................. 347/100 |
| 6,727,318 | B1 * | 4/2004 | Mathauer et al. ........... 524/801 |
| 2002/0150698 | A1 * | 10/2002 | Kawabata .................... 428/1.1 |
| 2003/0036018 | A1 * | 2/2003 | Li ........................... 430/280.1 |
| 2003/0045627 | A1 * | 3/2003 | Rosano et al. .............. 524/547 |

(Continued)

FOREIGN PATENT DOCUMENTS

EP 0534057 3/1993

(Continued)

OTHER PUBLICATIONS

International Search Report dated Oct. 23, 2003 for Application No. PCT/KR03/01634.

(Continued)

*Primary Examiner*—Manish S. Shah
(74) *Attorney, Agent, or Firm*—Cantor Colburn LLP

(57) ABSTRACT

The present invention relates to an ink composition for spacer formation and a spacer element using the same, and more particularly to an ink composition for spacer formation including a) 10 to 70 parts by weight (dry weight) of a polymer emulsion; b) 0.1 to 50 parts by weight of weight of wetting agent; and c) 20 to 90 parts by weight of solvent, and a spacer element using the same. The ink composition of the present invention has a significantly low viscosity and can be sprayed easily by inkjet, so that it is useful for spacer formation in liquid crystal displays.

6 Claims, 2 Drawing Sheets

U.S. PATENT DOCUMENTS

2004/0069364 A1* 4/2004 Momose .................. 141/1

FOREIGN PATENT DOCUMENTS

| EP | 0606997 | | 7/1994 |
|---|---|---|---|
| JP | 59-221923 | * | 12/1984 |
| JP | 59221923 | | 12/1984 |
| JP | 63186782 | | 8/1988 |
| JP | 2001083525 | | 3/2001 |
| JP | 2001109002 | | 4/2001 |
| JP | 2001117104 | | 4/2001 |
| JP | 2001200005 | | 7/2001 |
| JP | 2001042338 | | 2/2004 |
| KR | 1020030002288 | | 1/2003 |

OTHER PUBLICATIONS

Japanese Office Action dated Jun. 12, 2007 for Application No. 2004567179.

* cited by examiner

INK COMPOSITION FOR INKJET SPACER FORMATION AND SPACER ELEMENT USING THE SAME

BACKGROUND OF THE INVENTION (a) Field of the Invention

The present invention relates to an ink composition for spacer formation used for color televisions, computer monitors, and other display devices, and a spacer element using the same.

(b) Description of the Related Art

Demand for color liquid crystal displays has been on the increase in recent years, and large liquid crystal displays are being manufactured. However, manufacturing costs should be reduced in order for the color display devices to be used more widely.

Conventionally, a liquid crystal display is manufactured by forming a liquid crystal driving device, such as a TFT (thin film transistor), and a coloring device, such as a color filter, on a pair of opposing transparent insulating substrates. Between the substrates there are spacers that maintains a 3 to 10 μm space therebetween. Liquid crystal is injected in this space, and then the spacing is sealed to form a liquid crystal device.

Conventionally, spherical or cylindrical silica, alumina, or synthetic resin particles randomly distributed between the TFT substrate and the color filter substrate have been used as the spacer. But, in this case, the spacer around the light passage of the liquid crystal display may hinder driving of the liquid crystal or deteriorate the display quality due to the optical properties of the spacer itself.

In order to solve this problem, a method of selectively forming a spacer in the black matrix formation part through which no light passes, using a photoresist substance, has been proposed. In this case, the black matrix blocks the display quality-deteriorated part, and thus deterioration of display quality can be avoided.

However, when using a photoresist, the spacer formation process requires many steps including spin coating, pre-baking, exposure, developing, and post-baking of the spacer substance, and therefore the manufacturing cost increases.

To solve this problem, Korea Patent Publication No. 2001-0049941, Japan Patent Publication No. 2001-109002, and Japan Patent Publication No. 2001-83525 proposed a method for selectively forming a spacer on the black matrix through which no light passes, by the inkjet process.

Korea Patent Publication No. 2001-0049941 and Japan Patent Publication No. 2001-83525 proposed a cross-linking spacer-forming substance, which could be sprayed by the inkjet head, and which used a homopolymer or copolymer as a cross-linkable substance. Usage of the substance was limited from 0.01 to 30 parts by weight. During spacer formation, the sprayed solvent is evaporated in the cross-linking step, and only the homopolymer or copolymer forms the spacer. While the diameter of the ink droplet on the substrate surface remains almost the same due to its adhesivity, its height decreases, so that the height of the final spacer becomes significantly lower than that of the ink droplet. Accordingly, the height becomes insufficient for a high-resolution black matrix, which requires a small diameter.

In addition, Japan Patent Publication No. 2001-109002 proposed that it is preferable to use a monomer or oligomer with a low molecular weight, considering the spraying characteristics of the ink, while limiting the content of the solvent under 50 parts by weight and increasing the content of the spacer-forming substance. However, a substance with a low molecular weight does not have sufficient mechanical properties unless it is fully cross-linked, and light exposure or heat treatment for sufficient cross-linking increases manufacturing time and decreases productivity.

SUMMARY OF THE INVENTION

An object of the present invention is to provide an inkjet ink (hereunder, ink) composition having a significantly low viscosity and that is easily inkjet-sprayable by adding a cross-linking agent in an emulsion, which is obtained by dispersing a polymer with a relatively high molecular weight with an emulsifier, so that cross-linking by light exposure or heat treatment can be done in a short time.

Another object of the present invention is to provide a spacer formed by using the ink composition.

Still another object of the present invention is to provide a liquid crystal display comprising the spacer.

To attain these objects, the present invention provides an ink composition for spacer formation, comprising:

a) 10 to 70 parts by weight (dry weight) of a polymer emulsion;

b) 0.1 to 50 parts by weight of a wetting agent; and c) 20 to 90 parts by weight of a solvent.

The present invention also provides a spacer formed by the ink composition.

In addition, the present invention provides a liquid crystal display comprising the spacer.

DETAILED DESCRIPTION OF THE PREFERRED EMBODIMENTS

Figure 1:
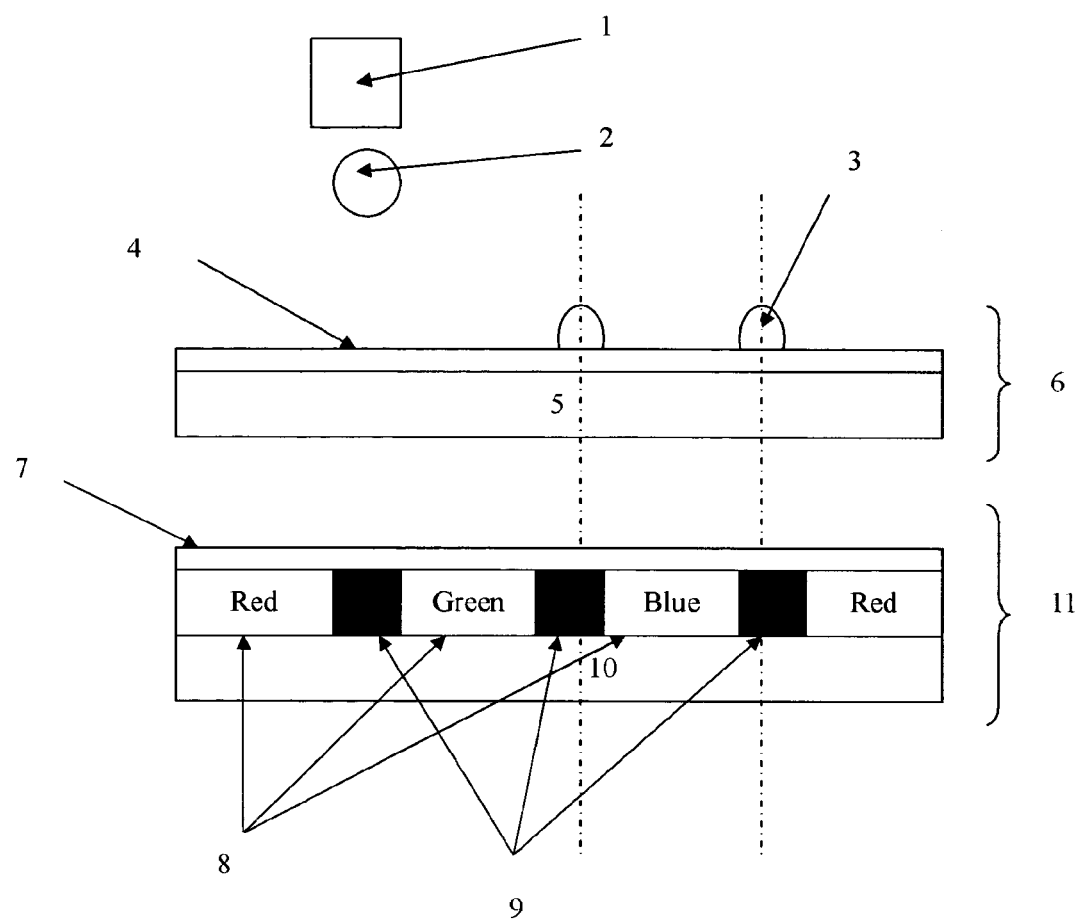
FIG. 1 is a schematic diagram of the spacer formation process of the present invention.

Hereinafter, the present invention is described in more detail.

The present invention relates to an ink composition for precisely forming a spacer on one of the two opposing substrates of a liquid crystal display, by the inkjet method.

Polymer chains of the polymer emulsion used in the present invention are surrounded by an emulsifying agent, not by water, and therefore the polymer emulsion has an almost spherical microstructure. Therefore, there is little entanglement between the polymer chains, differently from the system wherein the polymer chains are disentangled lengthily in a solvent.

Accordingly, an ink composition using the polymer emulsion has a much lower viscosity than a polymer solution having a comparable concentration and molecular weight, and therefore spraying by inkjet is much easier. Also, because even a hardly-soluble polymer can be emulsified using an appropriate emulsifying agent, a variety of polymers may be used to prepare ink. Also, because a polymer with a large molecular weight can be used without significantly increasing the viscosity of the ink, it is possible to prepare ink having good processability and capacity.

The ink composition of the present invention comprises a) a polymer emulsion, b) a wetting agent, and c) a solvent.

a) The polymer emulsion of the present invention is the basic material for forming the spacer. It has sufficient hardness and elasticity, superior heat resistance and chemical resistance, and sufficient adhesivity to the substrate surface. Also, it has a sufficiently low viscosity, preferably a viscosity of 3 to 50 cp, so that it can be sprayed by inkjet when prepared as ink.

Preferably, the polymer emulsion is selected from a group consisting of an acryl emulsion, a urethane acryl emulsion, an epoxy acryl emulsion, a polyester acryl emulsion, and any mixture thereof. However, it is not limited to said polymer emulsions. Preferably, the polymer emulsion has a molecular weight of 300 to 50,000.

Preferably, the polymer emulsion is used at from 10 to 70 parts by weight (dry weight). If the dry solid content of the polymer emulsion is below 10 parts by weight, the final height of the spacer becomes low. Otherwise, if it exceeds 70 parts by weight, it is difficult to obtain a stable emulsion.

b) The wetting agent of the present invention may be selected from a group consisting of: glycols, such as ethylene glycol, propylene glycol, diethylene glycol, triethylene glycol, and polyethylene glycol; glycerine; ethers of polyhydric alcohols, such as diethylene glycol monobutyl ether; acetates; thioglycol; and amino acids, such as glycine, methyl glycine, lucine, proline, alanine, and phenyl alanine.

Preferably, b) the wetting agent is used from 0.1 to 50 parts by weight. If the content of the wetting agent is below 0.1 part by weight, the ink may become dry around the nozzle, and thus it may not spray. Otherwise, if it exceeds 50 parts by weight, the solid content of the ink decreases, and therefore the final height of the spacer may become low.

Preferably, c) the solvent is selected from a group consisting of water, acetone, methyl ethyl ketone, methyl isobutyl ketone, methylcellosolve, ethylcellosolve, tetrahydrofuran, 1,4-dioxane, ethylene glycol dimethyl ether, ethylene glycol diethyl ether, propylene glycol methyl ether, propylene glycol dimethyl ether, propylene glycol diethyl ether, chloroform, methylene chloride, 1,2-dichloroethane, 1,1,1-trichloroethane, 1,1,2-trichloroethane, 1,1,2-trichloroethene, hexane, heptane, octane, cyclohexane, benzene, toluene, xylene, methanol, ethanol, isopropanol, propanol, butanol, t-butanol, cyclohexanone, propylene glycol methyl ether acetate, propylene glycol ethyl ether acetate, 3-methoxybutyl acetate, ethyl 3-ethoxy propionate, ethylcellosolve acetate, methylcellosolve acetate, butyl acetate, methyl ethyl ketone, methyl isobutyl ketone, ethylene glycol monomethyl ether, y-butyl lactone, N-methylpyrrolidone, dimethylformamide, tetramethylsulfone, ethylene glycol acetate, ethyl ether acetate, ethyl lactate, polyethylene glycol, and cyclohexanone.

Preferably, the solvent is used from 20 to 90 parts by weight. If the content of the solvent is below 20 parts by weight, the viscosity of the ink increases, so that it is not sprayed well. Otherwise, if it exceeds 90 parts by weight, the solid content of the ink decreases, and therefore the final height of the spacer may become low.

The ink composition of the present invention may further comprise d) a cross-linking initiator and a cross-linking promoter, e) a polymeric compound having unsaturated bonds, or f) other additives to control the inkjet spraying characteristics and the physical properties and form of the spacer. In the case the ideal properties can be obtained with only a) the polymer emulsion, d) the cross-linking initiator and the cross-linking promoter, and e) the polymeric compound having unsaturated bonds, may not be added. That is, if the polymer emulsion has a large molecular weight, the spacer has good physical properties, so that it is not necessary to add a cross-linking initiator and a cross-linking promoter, or a polymeric compound having unsaturated bonds. But, spraying from the inkjet nozzle may be somewhat difficult.

d) The cross-linking initiator and the cross-linking promoter of the present invention are water-soluble or soluble to the emulsifying agent. Initiation of cross-linking may be caused by light, heat, an electron beam, and so forth.

Preferably, the cross-linking initiator is selected from a group consisting of: biimidazole compounds, such as 2,2'-bis(2-chlorophenyl)-4,4',5,5'-tetraphenyl biimidazole and 2,2'-bis(2,3-dichlorophenyl)-4,4',5,5'-tetraphenylbiimidazole; acetophenone compounds, such as 2-hydroxy-1-[4-(2-hydroxyethoxy)phenyl]-2-methyl-1-propane, 2-hydroxy-2-methyl-1-phenylpropan-1-one, 1-(4-isopropylphenyl)-2-hydroxy-2-methylpropan-1-one, 4-(2-hydroxyethoxy)-phenyl(2-hydroxy)propyl ketone, 1-hydroxycyclohexyl phenyl ketone, benzoin methyl ether, benzoin ethyl ether, benzoin isobutyl ether, benzoin butyl ether, 2,2-dimethoxy-2-phenyl acetophenone, 2-methyl-(4-methylthiophenyl)-2-morpholino-1-propan-1-one, and 2-benzyl-2-dimethylamino-1-(4-morpholinophenyl)-butan-1-one;

benzophenone compounds, such as benzophenone, 4,4'-bis(dimethylamino)benzophenone, 4,4'-bis(diethylamino)benzophenone, 2,4,6-trimethylaminobenzophenone, methyl-o-benzoyl benzoate, 3,3-dimethyl-4-methoxybenzophenone, and 3,3',4,4'-tetra(t-butylperoxycarbonyl)benzophenone; fluorenone compounds, such as 9-fluorenone, 2-chloro-9-fluorenone, and 2-methyl-9-fluorenone; thioxantone compounds, such as thioxantone, 2,4-diethyl thioxantone, 2-chloro thioxantone, 1-chloro-4-propyloxy thioxantone, isopropyl thioxantone, and diisopropyl thioxantone; xanthone compounds, such as xanthone and 2-methylxanthone; anthraquinone compounds, such as anthraquinone, 2-methyl anthraquinone, 2-ethyl anthraquinone, t-butyl anthraquinone, and 2,6-dichloro-9,10-anthraquinone; acridine compounds, such as 9-phenylacridine, 1,7-bis(9-acridinyl)heptane, 1,5-bis(9-acridinyl)pentane, and 1,3-bis(9-acridinyl)propane; dicarbonyl compounds, such as benzyl-1,7,7-trimethyl-bischloro[2,2,1]heptane-2,3-dione and 9,10-phenanthrenquinone; phosphine oxides, such as 2,4,6-trimethylbenzoyl diphenylphosphine oxide, bis(2,6-dimethoxybenzoyl)-2,4,4-trimethylpentyl phosphine oxide, and bis(2,6-dichlorobenzoyl)propyl phosphine oxide; methyl 4-(dimethylamino)benzoate; ethyl-4-(dimethylamino)benzoate; amine synergists, such as 2-n-butoxyethyl 4-(dimethylamino)benzoate, 2,5-bis(4-diethylaminobenzal)cyclopentanone, 2,6-bis(4-diethylaminobenzal)cyclohexanone, and 2,6-bis(4-diethylaminobenzal)-4-methyl-cyclohexanone; coumarin compounds, such as 3,3'-carbonylvinyl-7-(diethylamino)coumarin, 3-(2-benzothiazolyl)-7-(diethylamino)coumarin, 3-benzoyl-7-(diethylamino)coumarin, 3-benzoyl-7-methoxy-coumarin, and 10,10'-carbonylbis[1,1,7,7-tetramethyl-2,3,6,7-tetrahydro-1H,5H,11H-Cl]-benzopy rano[6,7,8-ij]-quinolizin-11-one; calcon compounds, such as 4-diethylamino calcon and 4-azidobenzalacetophenone; 2-benzoylmethylene; 3-methyl-β-naphthothiazoline; and (4-methylphenyl)-[4-(2-methylpropyl)-phenyl]hexafluorophosphine iodide. And, preferably, the cross-linking promoter is selected from a group consisting of 2-mercaptobenzoimidazole, 2-mercaptobenzothiazole, 2-mercaptobenzoxazole, 2,5-dimercapto-1,3,4-thiadizole, 2-mercapto-4,6-dimethylaminopyridine, pentaerythritol tetrakis(3-mercaptopropionate), pentaerythritol tris(3-mercaptopropionate), pentaerythritol tetrakis(2-mercaptoacetate), pentaerythritol tris(2-mercaptoacetate), trimethylolpropane tris(2-mercaptoacetate), trimethylolpropane tris(3-mercaptopropionate), trimethylolethane tris(2-mercaptoacetate), and trimethylolethane tris(3-mercaptopropionate).

Preferably, the cross-linking initiator and the cross-linking promoter are used at less than 10 parts by weight.

Preferably, e) the ethylene polymeric compound having unsaturated bonds of the present invention is selected from a group consisting of: compounds obtained by esterification of polyhydric alcohols with α,β-unsaturated carboxylic acids, such as ethylene glycol di(meth)acrylate, (poly)ethylene glycol di(meth)acrylate having 2 to 14 ethylene groups, trimethylolpropane di(meth)acrylate, trimethylolpropane tri(meth)acrylate, pentaerythritol tri(meth)acrylate, pentaerythritol tetra(meth)acrylate, propylene glycol di(meth)acrylate having 2 to 14 propylene groups, dipentaerythritol penta(meth)acrylate, and dipentaerythritol hexa(meth)acrylate; compounds obtained by adding (meth)acrylic acid to glycidyl-containing compounds, such as a trimethylolpropane triglycidyl ether acrylic acid adduct and a bisphenol A diglycidyl ether acrylic acid adduct; esters of compounds having hydroxy groups or ethylene unsaturated bonds and polycarboxylic acids or adducts with polyisocyanates, such as a phthalic acid diester of β-hydroxyethyl (meth)acrylate and a toluene diisocyanate adduct of β-hydroxyethyl(meth)acrylate; and (meth)acrylic acid alkyl esters, such as methyl(meth)acrylate, ethyl(meth)acrylate, butyl(meth)acrylate, and 2-ethylhexyl(meth)acrylate.

Preferably, the polymeric compound having unsaturated bonds is used at less than 40 parts by weight.

Preferably, f) the other additives are selected from a group consisting of: silicon-based antifoaming agents; surface tension controlling agents for cationic, anionic, zwitterionic, and non-ionic surfactants; UV absorbers, such as benzotriazole or benzophenone; light stabilizers, such as phenols or amines; anti-biocontaminants such as chloromethylphenols; chelating agents such as EDTA; oxygen absorbents such as sulfites; and thermal polymerization inhibitors, such as p-anisole, hydroquinone, pyrocatechol, t-butylcatechol, and phenothiazine. Preferably, the additives are used at less than 5 parts by weight.

In the present invention, any compounds that are comprised in conventional inkjet ink compositions may be used for the additives of d) to f) for said purposes.

The ink composition of the present invention is sprayed onto a determined position of the substrate from an inkjet head. The sprayed ink forms a droplet on the substrate. Then, the substrate is heated or left alone at room temperature to evaporate the solvent from the ink. The spacer is formed by and cross-linking reaction using light, heat, electron beams, etc., if required.

Accordingly, the present invention can precisely form a spacer at an ideal position on at least one of the two opposing substrates of a liquid crystal display by the inkjet method.

Figure 2:
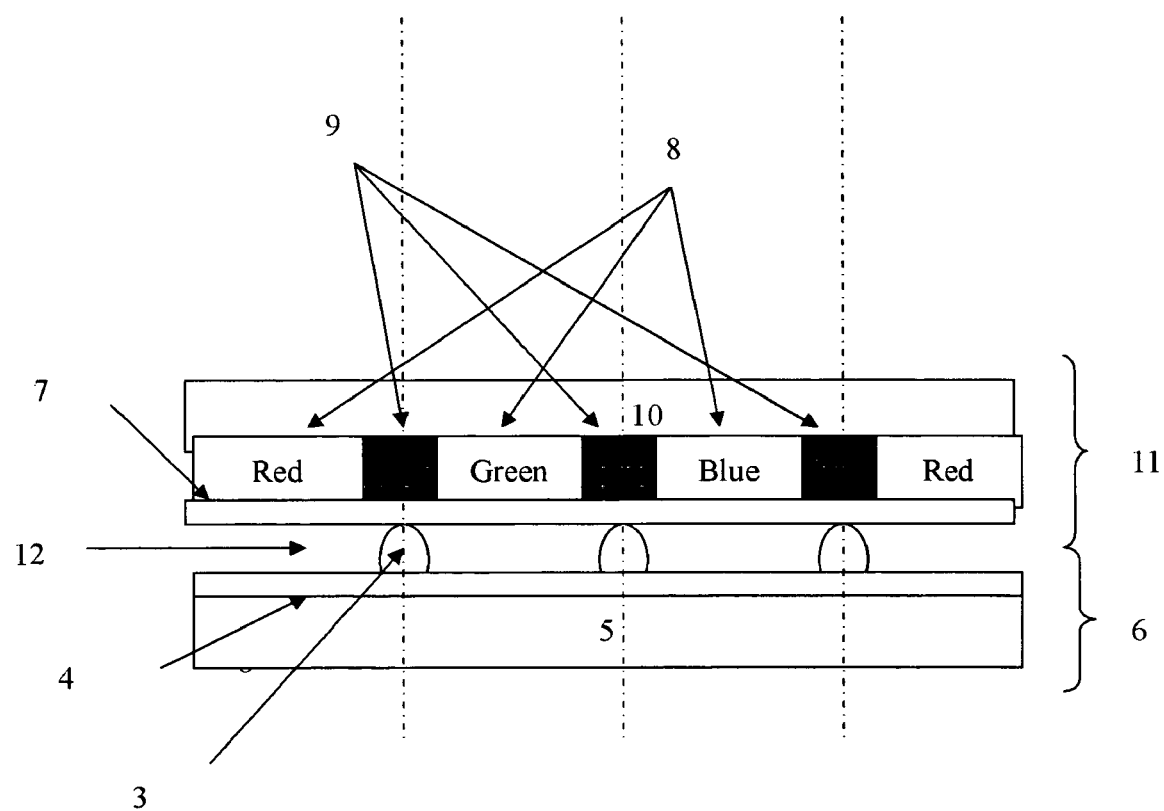
FIG. 2 is a schematic diagram of the liquid crystal display comprising the spacer of the present invention.

FIG. 1 is a schematic diagram of the spacer formation process of the present invention, and FIG. 2 is a schematic diagram of the liquid crystal display comprising the spacer of the present invention. In said drawings, the vertical dotted lines show that the spacer formed by the inkjet is positioned at a black matrix formation part of a color filter substrate.

Hereinafter, the present invention is described in more detail through Examples and a Comparative Example. However, the following Examples are only for the understanding of the present invention, and the present invention is not limited by the following Examples.

EXAMPLE 1

63 parts by weight of Neocryl (Zeneca); 20 parts by weight of glycerol, 15 parts by weight of water, and 2 parts by weight of CX100 (Zeneca) as a cross-linking emulsion were mixed well to prepare an acryl emulsion, and then filtered with a 2.5-μm filter. The viscosity was 11 cp. The emulsion was sprayed through an inkjet nozzle on a glass substrate on which a transparent electrode or an alignment film was formed. Then, the substrate was dried at 80° C. for 2 minutes to evaporate the solvent, and thermal cross-linking was carried out at 150° C. for 30 minutes. As a result, a spacer with of a diameter of 25 μm and a height of 4 μm was formed. The hardness of the spacer was over 4H.

EXAMPLE 2

70 parts by weight of Ebecryl (UCB), 15 parts by weight of glycerol, and 15 parts by weight of water were mixed to prepare an acryl emulsion, and then filtered with a 2.5-μm filter. The viscosity was 15 cp. A spacer was formed as in Example 1, while omitting the thermal cross-linking step. As a result, a spacer with a diameter of 27 μm and a height of 4.5 μm was formed. The hardness of the spacer was over 2H.

COMPARATIVE EXAMPLE 47 parts by weight of polyethylene glycol diacrylate, a water-soluble monomer, 20 parts by weight of ethoxytrimethylolpropane triacrylate ester, 10 parts by weight of glycerol, 20 parts by weight of water, and 3 parts by weight of Irgacure 2959 (Ciba Specialty Chemicals) as a photo initiator were mixed to prepare ink by the conventional method, and then filtered with a 2.5-μm filter. The viscosity was 27 cp. The ink was sprayed through an inkjet nozzle on a glass substrate. After 3 minutes of pre-baking at 70° C., UV was irradiated for 3 minutes and post-baking was carried out at 150° C. for 30 minutes. As a result, a spacer with a diameter of 50 μm and a height of 3 μm and a satellite of a meter of 10 μm and a height of 1 μm were formed. The hardness of the spacer was about HB.

Because the ink comprising the polymer emulsions of Examples 1 and 2 had a much lower viscosity than the polymer solution of Comparative Example, spraying by inkjet was easy. Additionally, the spacer formed with the ink comprising the polymer emulsion with a large molecular weight had better mechanical hardness than the spacer formed by the ink comprising the polymer solution. Also, as in Example 2, some spacers showed good hardness without a cross-linking step.

As described above, the ink composition for spacer formation of the present invention has a significantly low viscosity and can be easily sprayed by inkjet, so that it is useful for spacer formation in liquid crystal displays.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A composition for spacer formation in a liquid crystal display, having a viscosity of 3 to 50 cp and comprising:
   a) 10 to 70 parts by weight (dry weight) of a polymer emulsion;
   b) 0.1 to 50 parts by weight of wetting agent; and
   c) 20 to 90 parts by weight of a solvent, wherein the polymer emulsion has a molecular weight of 300 to 50,000, wherein the polymer emulsion is selected from the group consisting of an acryl emulsion, a urethane acryl emulsion, an epoxy acryl emulsion, a polyester acryl emulsion, and any mixture thereof, and wherein the wetting agent is selected from the group consisting of glycols, glycerine, ethers of polyhydric alcohols, acetates of polyhydric alcohols, thioglycol, and amino acids.

2. The composition according to claim 1, wherein c) the solvent is selected from a group consisting of water, acetone, methyl ethyl ketone, methyl isobutyl ketone, methylcellosolve, ethylcellosolve, tetrahydrofuran, 1,4-dioxane, ethylene glycol dimethyl ether, ethylene glycol diethyl ether, propylene glycol methyl ether, propylene glycol dimethyl ether, propylene glycol diethyl ether, chloroform, methylene chloride, 1,2-dichloroethane, 1,1,1-trichloroethane, 1,1,2-trichloroethane, 1,1,2-trichloroethene, hexane, heptane, octane, cyclohexane, benzene, toluene, xylene, methanol, ethanol, isopropanol, propanol, butanol, t-butanol, cyclohexanone, propylene glycol methyl ether acetate, propylene glycol ethyl ether acetate, 3-methoxybutyl acetate, ethyl 3-ethoxy propionate, ethylcellosolve acetate, methylcellosolve acetate, butyl acetate, methyl ethyl ketone, methyl isobutyl ketone, ethylene glycol monomethyl ether, γ-butyrolactone, N-methylpyrrolidone, dimethylformamide, tetramethylsulfone, ethylene glycol acetate, ethyl ether acetate, ethyl lactate, polyethylene glycol, and cyclohexanone.

3. The composition according to claim 1, which further comprises d) less than 10 parts by weight of a cross-linking initiator and a cross-linking promoter; or e) less than 40 parts by weight of polymeric compound having unsaturated bonds.

4. The composition according to claim 1, which further comprises f) less than 5 parts by weight of additives selected from a group consisting of an antifoaming agent, a surface tension controlling agent, a light stabilizer, an anti-biocontaminant, an oxygen absorbent, and a thermal polymerization inbibitor.

5. A spacer formed by the composition according to claim 1.

6. A liquid crystal display comprising the spacer according to claim 5.

* * * * *